Aug. 5, 1958     J. R. HUBER     2,845,676
RELEASE MECHANISM WITH MANUAL AND POWER ACTUATION
Filed April 15, 1954     4 Sheets-Sheet 1
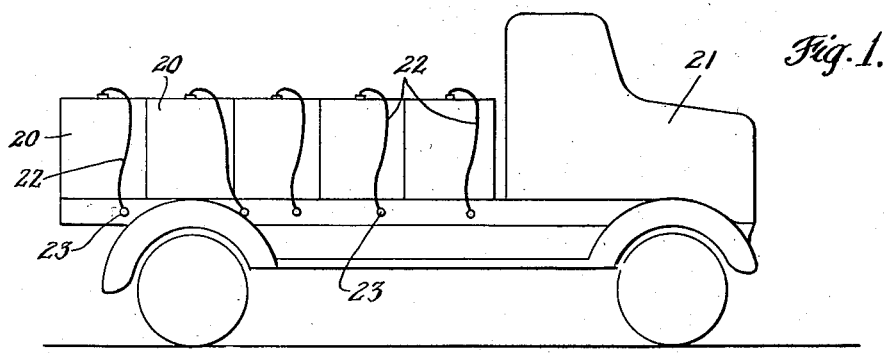
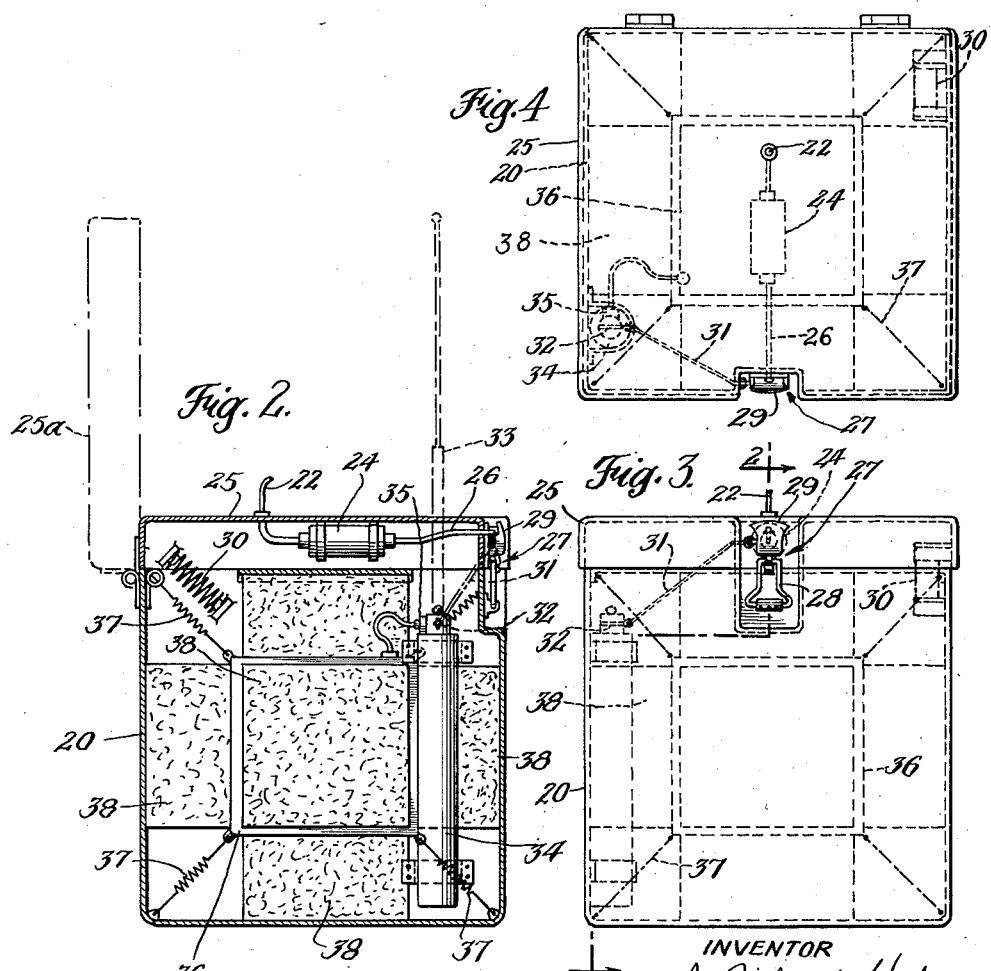
INVENTOR
J. Richard Huber
BY Harris S. Campbell
ATTORNEY Aug. 5, 1958  J. R. HUBER  2,845,676
RELEASE MECHANISM WITH MANUAL AND POWER ACTUATION
Filed April 15, 1954  4 Sheets-Sheet 2
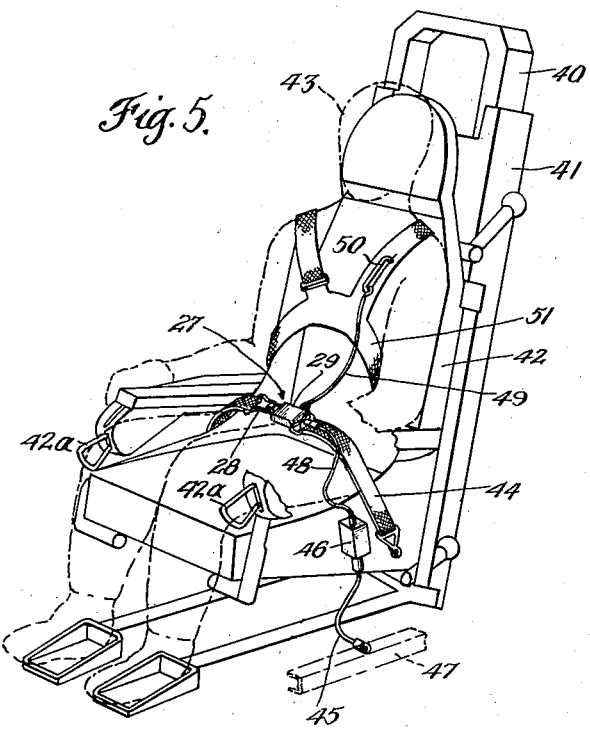
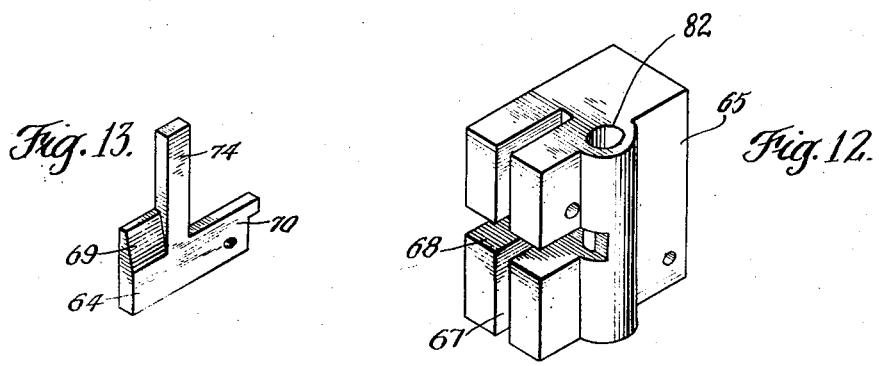
INVENTOR
J. Richard Huber
BY Harris S. Campbell
ATTORNEY Aug. 5, 1958     J. R. HUBER     2,845,676
RELEASE MECHANISM WITH MANUAL AND POWER ACTUATION
Filed April 15, 1954     4 Sheets-Sheet 3
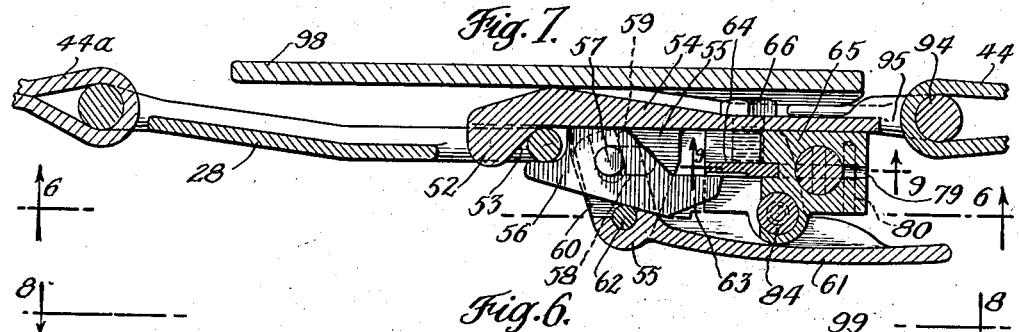
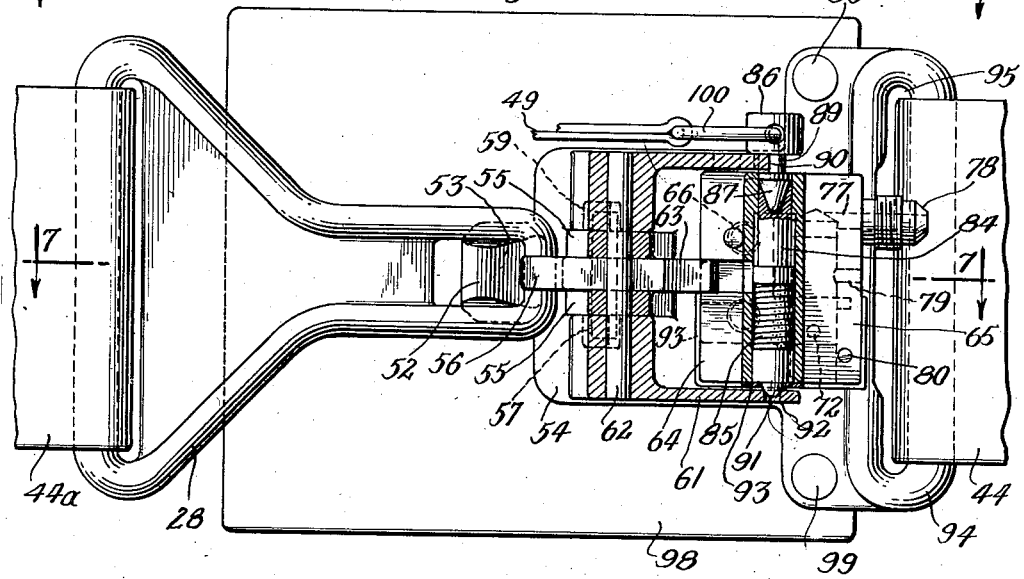
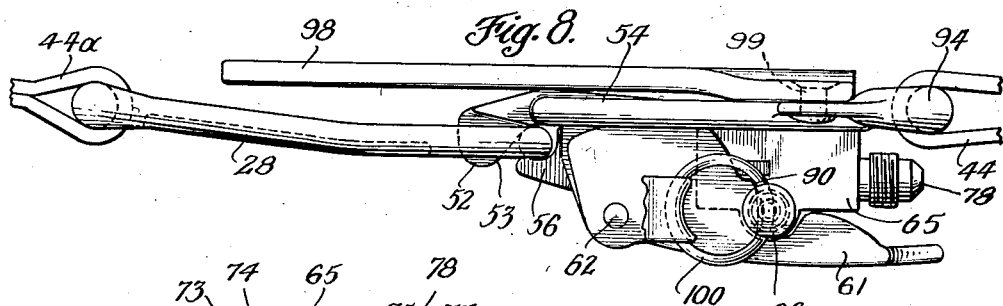
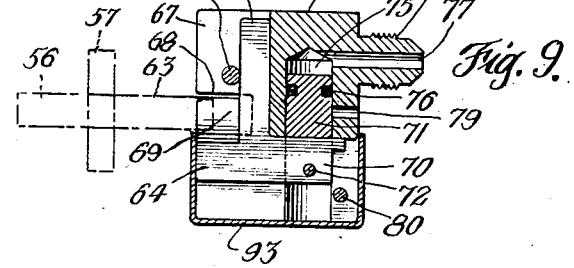
INVENTOR
J. Richard Huber
BY Harris S. Campbell
ATTORNEY

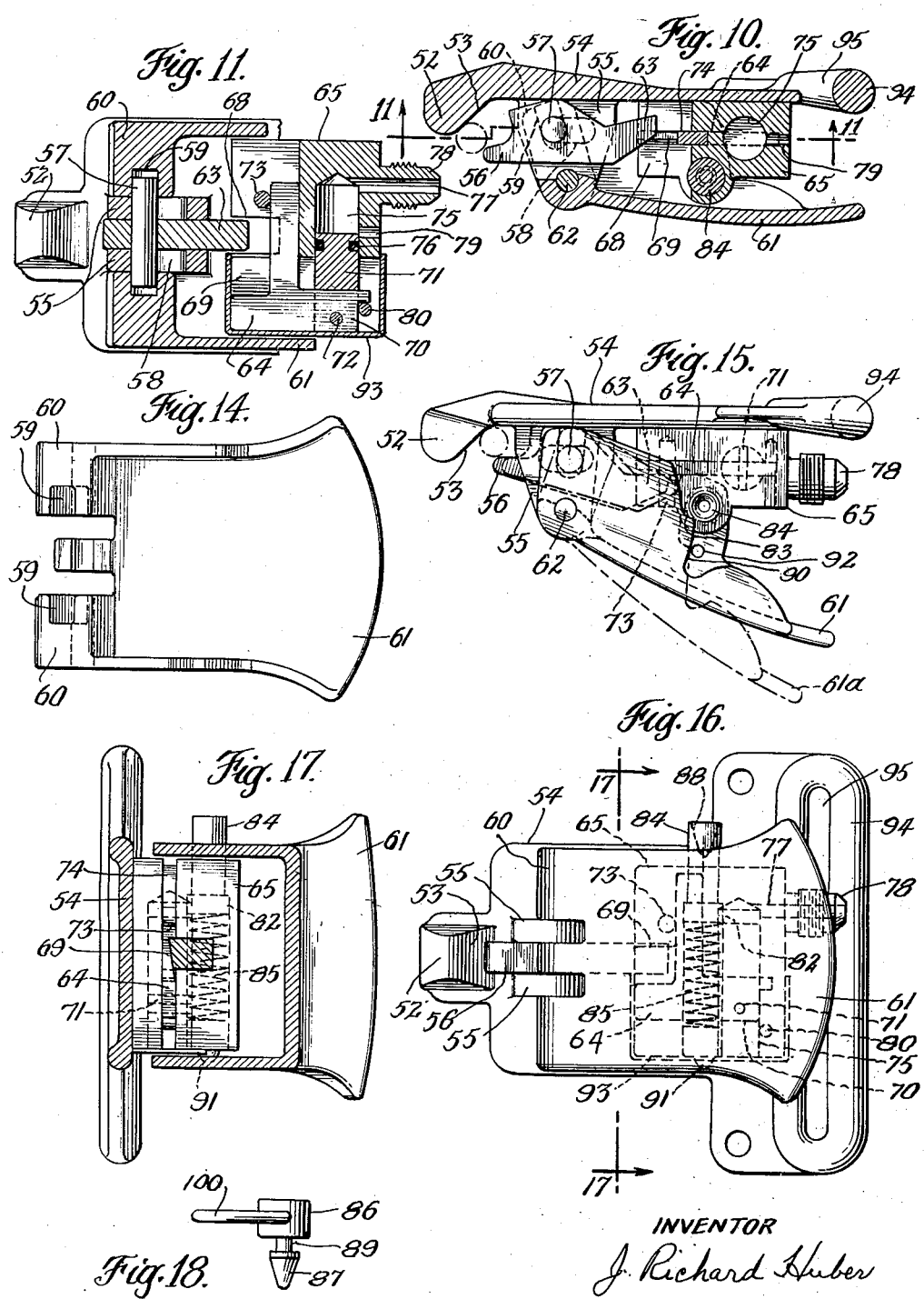

United States Patent Office 2,845,676
Patented Aug. 5, 1958

2,845,676

RELEASE MECHANISM WITH MANUAL AND POWER ACTUATION

John Richard Huber, Warrington, Pa., assignor to Eastern Rotorcraft Corporation, Doylestown, Pa., a corporation of Pennsylvania Application April 15, 1954, Serial No. 423,499

13 Claims. (Cl. 24—201)

This invention relates to releasing devices of the latch type which may be released under either powered operation or manually and which incorporate interlocking mechanism to decommission further automatic sequential operations when manual operation is accomplished.

Apparatus of this nature is of particular value in release systems where sequential release operations of different types occur automatically after an initial controlled release has occurred. Associated with the automatic releasing system is the arrangement wherein a release mechanism which is operated by power automatically at the correct time may also be actuated manually. Manual operation of this release introduces a break in the connection between this main release and the next release which would normally be actuated automatically. Thus, when the chain of the automatic release sequence is broken at this point the next release must be also operated manually. In addition manual engagement of the intermediate release can be accomplished only when a key member is properly inserted in the release, thereby providing the connection to the next release to accomplish the automatic sequence.

A typical system in which a release of the type with which the present invention is concerned, is the pilot's escape apparatus used with high-speed, high altitude aircraft. In this system it is customary to incorporate a pilot's seat which is mounted for power ejection with the pilot in position. Subsequent to clearing the aircraft, the pilot is released from the seat through the action of the release of the seat belt. Releasing the seat belt causes release of the parachute which may then open and support the pilot. If desired, delayed action mechanism may be incorporated to accomplish certain releases under controlled conditions. In this example, direct release mechanism serves to start the train of automatic releasing devices which then continue to complete their subsequent functions at the proper time. Delayed release after initiating action may be controlled either by timing mechanism or by a barometric device where altitude is the critical factor. Thus, the pilot need only pull the lever for release of the seat and the ejection of the seat from the aircraft causes triggering of a timing device which at the end of the predetermined time releases the power which may be a spring, compressed air, an explosive charge, or the like, to cause the release of the safety belt. A connection between the pilot's chute mechanism and the seat belt release causes the release of the parachute for opening either through a direct connection or through a pressure controlled mechanism which completes the release operation after a free drop to a safe altitude.

A similar system of sequential release operations may be used for many other purposes, such as for example, the release of equipment from special protective containers and subsequent procedures which may be needed to set the equipment up for automatic operation. Thus equipment such as location radio sets may be dropped from low flying aircraft, or ground vehicles. The special protective containers may be caused to open automatically at a predetermined interval after being dropped and the opening operation subsequently causes release of additional controls for extending an aerial and closing the necessary circuits to place the equipment in operation.

The present invention contemplates improved mechanism for a release system particularly in connection with the particular release which may be operated either manually or by power.

A primary object of the invention is the provision of a compact release unit in which the manual operation involves a lever member for actuating a release device. By locating the power actuating cylinder with its axis parallel to the lever pivot an extremely compact device with relatively simple actuating mechanism may be produced.

Another object of the invention is the provision of a release device in which a latch member may be moved in two different ways. Manual operation provides for longitudinal displacement of the latch member while power operation provides for pivotal or tilting movement of the latch member.

A further object of the invention is to provide an automatic latch release mechanism which incorporates a cylinder and piston having internal resilient ring adapted to normally seal the cylinder during the operating portion of its stroke, but which also provides for retaining the piston and connecting parts in proper position by means of frictional restraint, thereby eliminating the need for more complicated detents or piston latch mechanism.

Another object of the invention is the provision of plunger type safety lock mechanism combined with handle detent mechanism. This construction conserves space and simplifies the mechanism, while at the same time, it operates to prevent manual locking without engagement of the lock key.

How the foregoing and other objects and advantages of the invention are accomplished will be clear from the following description of the drawings, in which—

Figure 1 is a somewhat diagrammatic view of a vehicle incorporating containers equipped with the latch mechanism of the present invention.

Figure 2 is a sectional view through one of the containers showing the latch device.

Figure 3 is a front elevational view of the container shown in Figure 2.

Figure 4 is a plan view of the container.

Figure 5 is a perspective view of an aircraft ejection seat showing an important application of the latch device of the present invention.

Figure 6 is a plan view to an enlarged scale of the latch device in closed position, certain parts being shown in section as indicated by arrows 6—6, Figure 7.

Figure 7 is a sectional view of the latch taken in the direction of arrows 7—7, Figure 6.

Figure 8 is an elevational view of the latch taken in the direction of arrows 8—8, Figure 6.

Figure 9 is a sectional view through the operating piston and cylinder block taken in the direction indicated by arrows 9—9, Figure 7, the parts being in latch closed position.

Figure 10 is a sectional view of a portion of the latch generally similar to Figure 7 but showing the release parts in power released position.

Figure 11 is a sectional view in the direction of arrows 11—11, Figure 10, with the piston and connecting parts in power released position.

Figure 12 is a perspective view of the cylinder block member.

Figure 13 is a perspective view of the latch supporting member which is connected to the power piston.

Figure 14 is a view of the latch handle looking toward the inside.

Figure 15 is an elevational view of the actuating parts generally similar to Figure 8 but showing the manual release parts moved to released position.

Figure 16 is a plan view of the parts in manually released position showing the key cylinder in projecting position.

Figure 17 is a sectional view of the mechanism of Figure 16 taken in the direction of arrows 17—17, Figure 16.

Figure 18 shows the detail construction of the release latch key member.

Referring to the figures, Figure 1 illustrates one manner in which the latch mechanism of the present invention may be used. Containers 20 are shown on truck 21, each container having a static line 22 which extends from the container to an anchor point 23 attached to the vehicle structure.

The construction and operation of the containers 20 will be clear by reference to Figures 2, 3 and 4 which illustrate in detail the actuating mechanism associated therewith. From the details illustrated in Figures 2, 3 and 4, it will be seen that the static line 22 extends to a timing and power release device 24 attached to the lid structure 25 of the containers 20. The unit 24 may include a timing mechanism of any suitable type, such as a pneumatic piston and orifice having spring actuation to move at a predetermined rate. Unit 24 also contains a source of pressure or power which is released by the timing device. Standardized units of this nature are available, for example those which include an explosive shell fired by the timing device at the end of its preset interval after initial release. Power released from the unit 24 is transferred in the form of gas pressure through tube 26 extending from unit 24 to the release or latch mechanism indicated by numeral 27. This latch mechanism serves to retain the lid 25 in closed position on container 20. While the details of the latch device 27 will be described in detail later, it will be observed from Figures 2 and 3 that a link 28 is attached to the container while a release portion 29 of the latch mechanism is fastened to lid 25. Engagement of link 28 in latch mechanism 29 holds lid 25 in closed position.

Release of the mechanism 29 may be accomplished either manually by moving the handle portion associated with the mechanism 29 attached to lid 25, or by actuation of power mechanism 24 when it is released by pulling out static line 22. In either case, release of the mechanism 29 disconnects link 28 from the lid and permits the lid 25 to open under the influence of spring 30 which forces the lid into dotted outline position 25a. As the lid opens a cable connection 31, extending between latch mechanism 29 attached to the lid and pin 32, causes the pin 32 to be withdrawn. Withdrawal of pin 32 in turn permits the aerial shown in dotted outline in extended position at 33 to extend from container 34. Spring or compressed air mechanism of suitable type may be used for the aerial extension operation. Extension of aerial 33 in turn actuates an electric switch 35 which energizes the radio device located in central box 36. Box 36 is supported inside the container 20 by means of locating and cushioning springs 37 as well as by suitable resilient insulating pads 38.

Apparatus of this nature may be used to send out a special identifiable signal to provide accurate position information. This may be used for various purposes, such as in military operations where signals may be received from several known signal points and by triangulation the position of the receiver may be accurately established. The operational procedure involves dropping the containers 20 from a moving vehicle which may be a truck if the terrain is suitable, or from a low flying aircraft. The location of each of the units is accurately recorded and each sending set is identifiable by an individual signal. As the container is separated from the vehicle, the static line 22 is pulled out and initiates the timer device which in turn actuates the release for generation of pressure to trip the latch release at a predetermined interval after separation from the vehicle. Release of latch link 28, as previously noted, permits spring 30 to open the lid 25. In the event that the container should come to rest in an inverted position, the spring 30 is of sufficient capacity to cause the container to be tilted away from the lid to an open position with the lid lying on the ground. In this case, the aerial extends in a horizontal direction, but its functioning is unimpaired. The extension of the aerial also sets in action the periodic signal transmission which continues until the power source is exhausted, or the apparatus is retrieved.

In Figure 5 the latch apparatus of the present invention is illustrated in somewhat diagrammatic form with an ejection seat for use with high speed military aircraft. A frame structure 40 is shown supporting a carriage 41 to which the seat structure 42 is attached. The frame 40 is rigidly connected to the structure of the aircraft and carriage 41 is normally connected securely to frame 40 by means of latch structure which is not shown. Seat 42 may be adjusted relative to carriage 41 in order to accommodate pilots of different sizes. In the event that the pilot wishes to escape from a damaged aircraft, he operates suitable control mechanism such as interconnected seat latch handles 42a. The carriage 41 together with seat 42 and the pilot, indicated at 43 in broken outline, are thereby released and forcibly ejected from the aircraft, the frame 40 acting as the guide for carriage 41 while it is accelerated in the process of leaving the aircraft. The pilot is normally held in position on seat 42 by means of seat belt 44 which incorporates the buckle and release mechanism indicated generally by numeral 27 and including the releasable link 28 and release mechanism 29. The latter three numerals represent the same parts as the corresponding numerals in the release mechanism illustrated in Figures 2 to 4.

In the seat ejection system shown in Figure 5 a static line 45 is shown extending from box unit 46 attached to the seat structure to the fuselage structural member 47. Line 45 and unit 46 correspond operationally to line 22 and unit 24 described previously. The action of ejecting the seat from the aircraft separates static line 45 from unit 46 thereby setting in motion a timing device which may be similar to that described above in connection with unit 24 and which at the end of a predetermined interval sets off an explosive charge to generate gas pressure which is conducted through a flexible tube 48 to the buckle or latch release 29. This pressure causes disengagement of the link 28 thereby permitting the pilot to separate from seat 42. A second static line 49, which corresponds operationally to line 31 described previously, is attached to the buckle assembly 29 so that upon separation of the pilot from the seat 42 the parachute release ring 50 is withdrawn thereby releasing the parachute which is strapped to the pilot by means of harness 51.

The manner in which the release mechanism is constructed and operates is shown in Figures 6 to 18 inclusive. Referring to Figures 6, 7 and 8, the latch mechanism is illustrated to an enlarged scale in closed position. Here it will be seen that the releasable link 28 has one end in engagement with a projecting terminal 52 of the release mechanism. The projection 52 incorporates an inclined surface 53 against which link 28 lies while in latched position. Projection 52 is connected to frame plate 54 to which lugs 55 are also attached. Latch member 56 is supported between lugs 55 by means of pivot 57 which extends through slots 58 in lugs 55 and projects beyond lugs 55 into the slots 59 in the extension 60 of handle 61. Handle 61 is in turn pivoted at 62 near the outer ends of lugs 55. It will be noted that latch 56 extends between the frame plate 54 and the handle 61 with projecting arm 63 which, in the position shown in Figures 6, 7 and 8, rests on a plate 64. In this closed position the end of link 28 is retained securely in position between the projection 52 and the end of latch 56. Figure 13 shows the shape of plate 64.

Plate 64 is supported in position by means of block 65 which is held on frame 54 by suitable means, such as by screws 66. The shape of block 65 is shown in greater detail in Figures 9 and 12 where it will be observed that slot 67 is provided to support plate 64 in position. Another slot 68 at 90 degrees to slot 67 is located in position directly under the position of the inner end 63 of latch 56, this part being shown in broken outline in Figure 9. As will be observed from this figure, the plate 64 in the position shown extends across the slot 68 so that the portion 69 of the plate which incorporates a slight slope lies adjacent inner end 63 of latch 56. As will also be observed, leg 70 of plate 64 is fastened to the piston member 71 by means of pin 72. Another pin 73 extends through block 65 in position to engage the edge of leg 74 of plate 64 to serve as a positioning guide. Piston 71 fits into cylindrical hole 75 in block 65. A sealing ring 76 is mounted either in a groove near the end of piston 71 as shown, or in a groove in block 65, and serves to provide an effective seal to prevent leakage of pressure around the piston. A delivery opening 77 extends through block 65 into the inner end of cylinder 75 to provide for the application of pressure to the cylinder. Block 65 is provided with a tube connecting terminal as indicated at 78 to permit connection of a flexible delivery tube (see tube 48, Figure 5, or tube 26, Figure 2).

As will be seen from Figures 10 and 11 application of pressure to cylinder 75 causes movement of piston 71 to its release position. In this position a bleed hole 79 in block 65 is uncovered and releases the pressure from the cylinder once it has driven the piston to its extreme position. Pin 80 acts as a stop to limit the travel of piston 71 and plate 64. In the position shown in Figure 11, portion 69 of plate 64 which previously was in contact with the end 63 of latch member 56 has been withdrawn so that it clears the latch end 63 thereby permitting the latch to tilt toward the base plate 54 as shown in Figure 10. It will be seen that the tilting of latch 56 about its pivot 57 allows increase in the gap between surface 53 of projection 52 and the end of the latch 56 to an extent that the end of engaging member 28 may be withdrawn. From the foregoing it will be clear that power operation of the latch, that is, release by applying pressure to cylinder 75, permits tilting of latch member 56 to accomplish the releasing action. During release in this manner handle 61 remains in closed position.

Actuation of latch 56 manually by the handle will be more clearly understood by reference to Figures 14 to 17, where it will be seen that pivot pin 57 of latch 56 extends through lugs 55 and beyond so that the ends of pin 57 may be engaged by slot 59 which forms a sort of pocket in each side of extension 60 of handle 61. Figure 14 shows the internal shape of the handle 61 with the pockets or slots 59. Figure 15 shows the handle in fully released position as indicated at 61a in broken outline. It will be noted that inner end 63 of latch 56 rests upon plate 64 which is in the position shown in Figure 9, namely, with the piston in unfired position. Thus movement of handle 61 causes a translational movement of latch pivot 57 in slots 59. In fully opened position 61a of the handle, latch 56 is withdrawn to a position where the end of link 28 can pass between latch 56 and projection 52. In order to engage member 28 in the latch, it is held in position and the handle moved from 61a to full line position 61, where the latch 56 is moved forward slightly to a position where the end of link member 28 can no longer escape through the opening between the latch and the projection 52. In this position of the handle, a projection 83 in the side plate of handle 61 strikes cylinder 84 as is clearly shown in Figure 15.

Cylinder 84 is held in projecting position (see Figure 16) by means of a spring 85 which is mounted inside cylindrical hole 82 in block 65. Thus to further close handle 61, cylinder 84 must be depressed into the block 65. To accomplish this key member 86 (see Figures 6 and 8) is used. Key member 86 is constructed with an enlarged head portion as shown with a tapered end 87 arranged to fit into tapered opening 88 in the end of cylinder 84. Between the head of key member 86 and tapered end 87, there is a reduced section 89 which provides an annular slot between the two parts. Thus when key 86 is inserted in the end of cylinder 84 and it is depressed against the force of spring 85, reduced portion 89 becomes aligned with the edge 90 of the handle thereby allowing the handle to swing down to closed position as shown in Figures 7 and 8. In this closed position edge 90 of the handle enters key slot 89 and thus retains key member 86 until such time as handle 61 is opened manually. With the handle completely closed as in Figure 7 latch 56 further closes the space between it and the projection 52 thus preventing withdrawal of link 28. Key 86 is also shown in Figure 18.

In order to provide against inadvertent opening of handle 61, a detent 91 projects from block 65 to engage a small hole 92 in the side plate of the handle 61. Detent 91 is in the form of a small piston member with the projection at one end. This fits into cylindrical opening 82 which holds cylinder 84. Detent 91 is urged outwardly by the same spring 85. These parts are held in position in block 65 by means of plate member 93 which may be held in position by suitable screws (not shown).

When the latch device is used in connection with the safety belt release such as illustrated in Figure 5, it is provided with a terminal 94 attached to the plate 54 which terminal incorporates a suitable slot 95 for the attachment of the strap member 44. Likewise, the end of link 28 is suitably constructed to permit attachment of the strap 44a. Also, in order to avoid the possibility of the latch parts becoming entangled with clothing or the like, leather or plastic plate 98 is attached to frame plate 54 by means of rivets 99.

As will be observed in Figures 6 and 7 key 86 is provided with ring 100 to which is attached static line 49 which is shown in Figure 5 connected to parachute release ring 50. Thus it will be evident that in case of power release of the release mechanism, handle 61 remains in closed position and consequently key 86 is retained in position on the release unit.

As applied to the system shown in Figure 5 the release mechanism therefore operates in the following manner. The seat belt member is normally in manually released position in which case key 86 is carried by the pilot attached to the parachute ring 50. In order to connect the buckle parts, the pilot after seating himself, places the link member 28 into position against the projection 52 and partly closes handle 61 until it engages cylinder 84 as shown in Figure 15. Link member 28 is then retained in position. With his free hand key 86 is inserted in the end of cylinder 84. The tapered end of the key serves to easily locate hole 88 even though the pilot may have on gloves or be working in poor light. Upon depressing the key into position the handle 61 can be completely closed and is retained in this position by the detent 91 until reopened by the pilot. In the event that it should be necessary to escape from the aircraft, the pilot operates the necessary controls to start the seat ejection mechanism. Ejection of the seat pulls static line 45 which sets in operation the timing device which in turn causes development of the pressure necessary to actuate piston 71 thereby moving plate 64 out of position so that latch 56 may tilt and release link 28. The release of the belt 44 in this fashion then permits the pilot to separate from the seat 42. However, since the static line 49 is still attached by means of ring 100 and key 86 to the belt 44, it serves to automatically pull parachute release ring 50 as the pilot separates from the seat thereby providing for the opening of the parachute. After powered operation of the release it is necessary to disassemble partly to remove plate 93 and force piston 71 and plate 64 back to unfired position.

In normal cases where no emergency arises, at the end of the flight the pilot can release the safety belt merely by opening handle 61. This permits the spring 85 to eject cylinder 84 and release key 86 so that it stays with the parachute ring and the pilot may move out of the seat taking his parachute and leaving the power operating mechanism in proper position for further use. Thus it will be seen that manual release disconnects static line 49 and prevents further automatic releases. Also the release mechanism can not be fully latched without inserting the key which connects up to provide for the additional sequential operations.

From the foregoing it will be evident that my improved mechanism provides a compact releasing unit which may be actuated either manually or by powered means. The use of a power cylinder which is located in a position parallel to the latch pivot allows an extremely compact and light weight unit to be produced. Mounting of the latch for tilting release upon power actuation permits the remaining manually operated latch mechanism to be simple and reliable. The combination locking cylinder and detent assembly further permits simplification of the construction and reduction of the number of parts. The use of a key member having a tapered end and a complete annular groove permits more rapid and positive insertion and locking and eliminates the need for directional positioning of the key member since it is in proper position throughout 360 degrees of rotation. The use of a sealing ring between the piston and the cylinder not only provides for positive sealing action to give efficient cylinder operation but also assures that the piston will be held in released position once it has been fired since the friction of the sealing ring prevents it from returning to closed position until the unit has been inspected and the cylinder definitely forced to closed position. As has been clearly shown from the foregoing description the release unit may be satisfactorily applied to accomplish different releasing problems where automatic sequential releases are required. It is of particular value for use in connection with the safety belt of the ejection seat in high speed aircraft.

I claim:

1. A load transfer device having latch mechanism comprising a retaining assembly and a releasable element, said assembly including a movable latch member engageable with said releasable element, a pivoted handle connected to said latch member, power actuated mechanism having a part engaging said latch member, said power mechanism including a cylinder and piston assembly having the axis thereof parallel to the pivot of said handle, and a fluid channel leading to said cylinder for connecting to a source of power, said engaging part being connected to said piston to provide movement of said part upon movement of said piston.

2. A load transfer device having latch mechanism, a releasable element, said mechanism including supporting structure, a movable latch member for engaging said element, said member having a pivot, a slotted support in which said pivot is mounted to provide for both pivotal and translational movement of said latch member, a handle pivotally supported on said structure, and connected to said latch member to cause translational movement thereof, and power actuated means including a piston and cylinder supported on said structure with interconnecting mechanism to control pivotal movement of said latch member.

3. A load transfer and release device having latch mechanism including a supporting structure, a latch member, a lug mounted on said structure having a slotted opening therein, a pivot extending into said opening supporting said latch in said lug for pivotal and translational motion, a handle mounted on said structure and connected to said latch, a cylinder and piston supported on said structure with the axis of the cylinder parallel to the axis of said pivot, a fluid channel connected to said cylinder to provide for power actuation of said piston, and a part connected to said piston and engaging said latch member to normally hold it against pivotal motion, said part being movable by said piston to a position out of engagement with said latch member thereby permitting pivotal motion thereof.

4. Apparatus for providing automatic sequential release operations including a frame, a latch assembly having a movable latch part, a pivot supporting said latch part on said frame, a piston and cylinder having a connection to said latch part, said cylinder being mounted on said frame with its axis parallel to the axis of said latch part pivot, a fluid power connection to said cylinder, and a control unit for applying power to release said latch, a second release device for accomplishing another operation and a control connection between said latch assembly and said second release device.

5. A releasing device operative both manually and by power means including a latch assembly having a frame, a latch part supported on said frame for both pivotal and translational movement, a handle mounted on said frame and having a connection to said latch, and a power cylinder having a connection to said latch, said connections providing for control of both said pivotal movement and said translational movement.

6. Release mechanism including a latch assembly having a frame, a movable latch part mounted on said frame, a handle having a side plate connected to said latch part, power operated mechanism attached to said latch part, a spring loaded cylinder which prevents closing said handle when said cylinder is extended, said cylinder having a conical depression in the end, and a key having a conical shape at one end to fit the depression in said cylinder, said key having an annular groove around it near the end of the conical portion and having a head part which is larger than the maximum diameter of the conical portion, the width of said groove being proportioned to permit entry of the side plate of said handle thereby permitting closing of the handle when the key is used to depress said cylinder until said annular groove is in alignment with the side plate of the handle, the handle thus holding said key in place as long as the handle remains closed.

7. Releasable latch mechanism including a latch assembly having a frame, a movable latch part mounted on said frame, a handle mounted on said frame, power operated means for actuating said latch part including a block member having a cylindrical opening and a piston mounted therein, said block member having a second cylindrical opening extending therethrough, a handle stop barrel supported at one end of said second opening and a handle detent element supported at the other end of said second opening, and a coiled spring located in said second opening reacting against said barrel and said detent to urge each to extended position.

8. A load transfer device having latch mechanism which includes a movable latch part, a handle connected thereto, power operational parts including a cylinder and a piston mounted therein, a movable member connected to said piston and contacting said latch part when in engaged position, said piston being movable in said cylinder to move said member, and a resilient ring member supported to react between said piston and said cylinder to provide sealing during operation and to hold the piston in released position after power operation of the latch.

9. A load transfer device having latch mechanism including a releasable link, a movable latch part, a handle connected thereto, power operated parts for releasing said latch part from said link including a block having a cylinder and piston therein, a stop member slidably mounted in said block and having a depression to engage a key, a spring for extending a portion of said stop member beyond said block when said handle is open, and a key element shaped to fit the depression in said stop member, said handle having a portion shaped to engage said stop member to limit its travel to a partly closed position in which the releasable link may be retained in position thereby permitting the operator to use one of his hands to insert the key in the stop member to complete the closing of the handle and thereby produce full engagement of the latch part and the link.

10. A load transfer device having release mechanism including a releasable link, a movable latch part, a handle connected to said latch part, and power operated mechanism for moving said latch part including a block having a cylinder and piston therein, said handle having a plate portion extending adjacent said block in closed position and having side plates extending alongside the lateral edges of said block when in closed position, one of said side plates being adapted to engage handle retention mechanism and the other of said side plates being shaped to engage and retain a key member when in closed position.

11. A load transfer device having release mechanism including a releasable link, a movable latch part, a handle having a pivot on which it moves to actuate said latch part, power actuated mechanism for controlling said latch part, a spring loaded stop member movable in a direction parallel to the axis of said pivot, said handle having a flat plate portion positioned in a plane perpendicular to the axis of said pivot, and a key element having a conical end, said stop member having a conical depression to receive the end of the said key element, said key element incorporating an annular groove near the end of the conical part, the groove having a width adapted to accommodate the thickness of the flat plate portion of the handle, said plate portion of the handle being proportioned to extend into said groove when the handle is moved on to its pivot to closed position with the key inserted to depress said stop member.

12. A load transfer and release device having latch mechanism including a supporting structure, a lug on said structure, a latch member, a pivot connecting said member to said lug, said latch member having an extension part on one side of said pivot adapted to engage a releasable part, power operated release mechanism including a piston and cylinder assembly supported on said structure with the axis of the cylinder parallel to the axis of said pivot, said latch member having a portion extending on the opposite side of said pivot from said extension part, a part connected to said piston and engaging said latch portion to normally hold it against pivotal motion, said piston connected part being movable by said piston to a position out of engagement with said patch portion thereby permitting pivotal movement thereof, and a fluid channel connection to said cylinder to provide power actuation thereof.

13. A load transfer and release device having a link, mechanism for connecting said link to said device including a base plate member, a latch member having a part adapted to engage said link, a pivot structure connecting said latch member to said base plate, said latch member having a portion extending on the opposite side of said pivot from said link engaging part, a cylinder and piston assembly mounted on said base plate, a connecting part directly attached to the piston of said assembly, said connecting part being adapted to engage said latch member portion to retain it in link engaged position, a fluid channel connecting said cylinder and piston assembly with a source of power to move the piston in the cylinder to cause disengagement of said connecting part from said latch portion to permit tilting of said latch on its pivot and release of said link, and a handle member having connections adapted to release said link independently of said latch tilting release.

References Cited in the file of this patent

UNITED STATES PATENTS

| | | |
|---|---|---|
| 842,482 | Matson | Jan. 29, 1907 |
| 2,453,139 | Kleinkort | Nov. 9, 1948 |
| 2,489,984 | Shoemaker | Nov. 29, 1949 |
| 2,579,319 | Hudson | Dec. 18, 1951 |
| 2,665,163 | Gross | Jan. 5, 1954 |
| 2,667,376 | Schlachter | Jan. 26, 1954 |
| 2,689,697 | Stanley | Sept. 21, 1954 |

FOREIGN PATENTS

| | | |
|---|---|---|
| 696,795 | France | Oct. 20, 1930 |